US006931366B2

(12) United States Patent
Wang et al.

(10) Patent No.: US 6,931,366 B2
(45) Date of Patent: Aug. 16, 2005

(54) METHOD AND APPARATUS FOR ANALYZING A DESIGN

(75) Inventors: Steve C. Wang, Ann Arbor, MI (US); Agus Sudjianto, Novi, MI (US); David John Buche, Ypsilanti, MI (US); Dingjun Li, Riverview, MI (US); Mahesh Himatial Vora, Farmington Hills, MI (US); Nathan R. Soderborg, Ann Arbor, MI (US); Siyuan Jiang, Beverly Hills, MI (US); Xiaoping Liu, Plymouth, MI (US)

(73) Assignee: Ford Motor Company, Dearborn, MI (US)

( * ) Notice: Subject to any disclaimer, the term of this patent is extended or adjusted under 35 U.S.C. 154(b) by 718 days.

(21) Appl. No.: 09/681,398

(22) Filed: Mar. 29, 2001

(65) Prior Publication Data

US 2002/0143503 A1 Oct. 3, 2002

(51) Int. Cl.$^7$ .............................. G06F 7/60; G06F 17/10; G06F 101/00
(52) U.S. Cl. ........................ 703/2; 703/1; 703/6; 703/8; 702/179; 702/182
(58) Field of Search ............................... 703/1–2, 6–8; 702/179–184

(56) References Cited

U.S. PATENT DOCUMENTS 6,377,908 B1 * 4/2002 Ostrowski et al. .............. 703/2
6,405,344 B1 * 6/2002 Ali et al. ........................ 716/2

OTHER PUBLICATIONS

Ye et al, "Algorithmic Construction of Optimal Symmetric Latin Hypercube Design," Journal of Statistical Planning and Inference, vol. 90 No. 1, pp. 145–159 (Jul. 2000).*

Bailey et al, "Using Response Surfaces to Improve the Search for Satisfactory Behavior in System Dynamics Models," System Dynamics Review, vol. 16 No. 2, pp. 75–90 (2000).*

Hamada, "Using Statistically Designed Experiments to Improve Reliability and to Achieve Robust Reliability," IEEE Transactions on Reliability, vol. 44 No. 2, pp. 206–215 (Jun. 1995).*

Boning et al, "DOE/Opt: A System for Design of Experiments, Response Surface Modeling, and Optimization Using Process and Device Simulation," IEEE Transactions on Semiconductor Manufacturing, vol. 7 No. 2, pp. 233–244 (May 1994).*

Jin, Ruichen, et al., "An Efficient Algorithm for Constructing Optimal Design of Computer Experiments" Journal of Statistical Planning and Inference, In Press, Corrected Proof, Available online Jul. 29, 2004.

William J. Welch, Robert J. Buck, Jerome Sacks, Henry P. Wynn, Toby J. Mitchell and Max D. Morris, Screening, Predicting, and Computer Experiments, Technometrics, Feb., 1992, pp. 15–25, vol. 34, No. 1, U.S.

Jerome H. Friedman, Invited Paper, Multivariate Adaptive Regression Splines, Stanford University, 1991, vol. 19, No. 1, 1–141, The Annals of Statistics, U.S.

* cited by examiner

Primary Examiner—Samuel Broda
(74) Attorney, Agent, or Firm—David B. Kelley; Gifford Krass, et al.

(57) ABSTRACT

A system 10, which receives a computer, aided model or design 18 and which probabilistically analyzes the model 18 by use of a modified Latin Hypercube sampling technique and combined MARS and Kriging simulation methodologies, thereby allowing a simulation to be conducted at a most probable point of operation and allowing products having desired characteristics and attributes to be created.

21 Claims, 5 Drawing Sheets

Study Goal:
- ☐ Assessment — 66
- ☐ Parameter Design — 68
- ☐ Tolerance Design — 70

System Input: ____

Control Factor Table

| Para No | Parameter Description | Nominal | Design Range | | Variation | Parameter in Model? | Surrogate? | Sensitivity Available? | | Remark |
|---|---|---|---|---|---|---|---|---|---|---|
| | | | Lower Bound | Upper Bound | | | | R1 | R2 | |
| 1 | XXX | XXX | XXX | XXX | XXX | XXX | XXX | XXX | XXX | XXX |
| 2 | | | | | | | | | | |
| 3 | | | | | | | | | | |

System Response: 1) ____  2) ____

Noise Factor Table

XXX

METHOD AND APPARATUS FOR ANALYZING A DESIGN

BACKGROUND OF INVENTION

The present invention generally relates to a method and an apparatus for analyzing and/or optimizing a design and more particularly, to a probabilistic based software based system which may be used to selectively analyze the overall reliability, robustness, and other features and/or characteristics of a design which is created by and/or which is based upon a computer aided design type model, effective to allow for the production of an item having desirable features and characteristics.

Traditional design techniques require the creation of one or more physical prototypes of an item or element which is to be produced. The prototypes are then subjected to a variety of tests. Further, various changes are made to the prototypes and/or new prototypes are created as a result of these tests and these changes or modifications are tested in order to allow for the production of a final product which has desirable characteristics and features (e.g., a relatively high reliability).

While these traditional design techniques or methods are effective, they are relatively costly and time consuming. One attempt at improving upon these drawbacks of these traditional design techniques utilizes a computer generated or computer aided design "CAD" model which simulates the item or product which is to be created and which represents and/or comprises a certain design of the item or product. The computer system may be used to perform various tests and/or modifications upon the model or design, thereby allowing a user to determine the desirability of the design.

While this approach does reduce the amount of time required for testing, it does not reliably assess the operation of the item or product in a "real operational setting" since this approach does not account for variations or dynamic changes occurring in the values of the various variables used to model the item or product which commonly occur in a "real operational setting". This deterministic approach therefore does not allow a product or item to be analyzed in a "real world" situation and does not reliably allow for the production of an item having desired characteristics and/or attributes.

There is therefore a need for a new and improved system which allows computer type models to be created of an item or product and which further allows these computer type models to be analyzed and tested in an environment which substantially simulates the "real operational environment" into which the produced item or product is to be operationally placed, thereby allowing for the creation of an item or product having a relatively high reliability, robustness and various other features and/or characteristics.

SUMMARY OF INVENTION

It is a first non-limiting advantage of the present invention to provide a method and an apparatus for analyzing a design based upon and/or represented by a computer generated model of an item or product in a manner which overcomes some or all of the previously delineated drawbacks of prior methods and apparatuses.

It is a second non-limiting advantage of the present invention to provide a method an apparatus for probabilistically analyzing a design based upon and/or represented by a computer generated model of an item or product in a manner which overcomes some or all of the previously delineated drawbacks of prior methods and apparatuses.

It is a third non-limiting advantage of the present invention to provide a method and an apparatus for analyzing a design based upon and/or represented by a computer generated model of a product or item in a cost effective and efficient manner, effective to allow an item or product to be produced having a relatively high reliability and various other desirable features and characteristics.

According to a first aspect of the present invention, a system is provided to analyze a design which is based upon a computer generated model. The system includes a computer that operates under stored program control and which probabilistically analyzes the computer generated model.

According to a second aspect of the present invention, a method for analyzing a design which is based upon a computer generated model type design is provided. The method includes the steps of receiving the computer generated model; creating at least one variable; and probabilistically analyzing the computer generated model by the use of the at least one variable.

These and other features, aspects, and advantages of the present invention will become apparent from a reading of the detailed description of the preferred embodiment of the invention and by reference to the following drawings.

DETAILED DESCRIPTION

Figure 1:
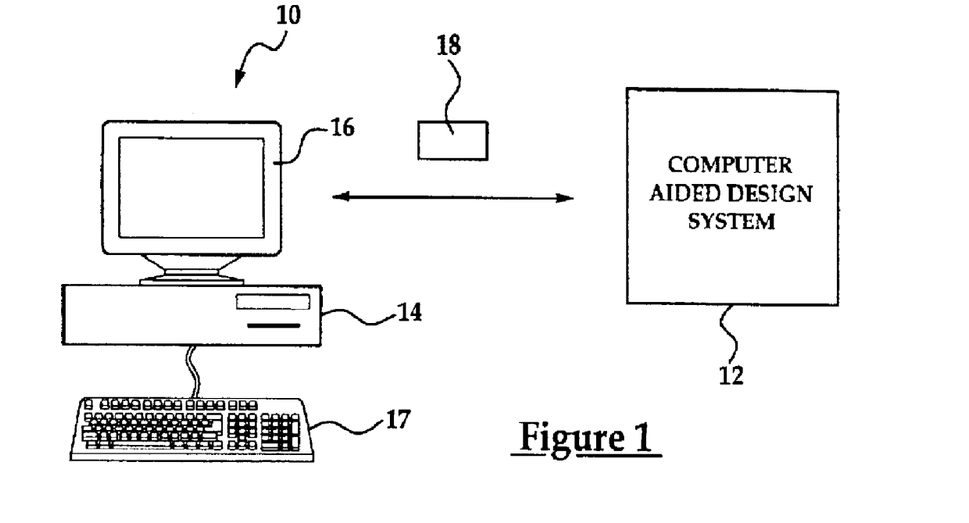
FIG. 1 is a block diagram of a computer analysis system which is made in accordance with the teachings of the preferred embodiment of the invention in communicative combination with a conventional computer aided design system.

Referring now to FIG. 1, there is shown a computer system 10 which is made in accordance with the teachings of the preferred embodiment of the invention and which selectively communicates with a conventional or typical computer aided design system 12.

Particularly, computer system 10 includes a computer processor or controller 14 which operates under stored program control, a display 16 which is operatively, physically, and communicatively coupled to the processor or controller 14 and which is adapted to visually display certain information which is received from the processor or controller 14 or from system 12, and a keyboard 17 or other conventional and commercially available input device which is physically, operatively, and communicatively coupled to the processor or controller 14 and which is adapted to allow a user of the system 10 to command the system 10 to selectively perform one or more operations.

Conventional computer aided design model 18 represents and/or comprises a certain design or product which may be selectively communicated to the system 10 (e.g., to the controller or processor 14) from the system 12. This model (e.g. the design which is represented by the model 18) is then evaluated according to the methodology of the preferred embodiment of the invention.

Figure 2:
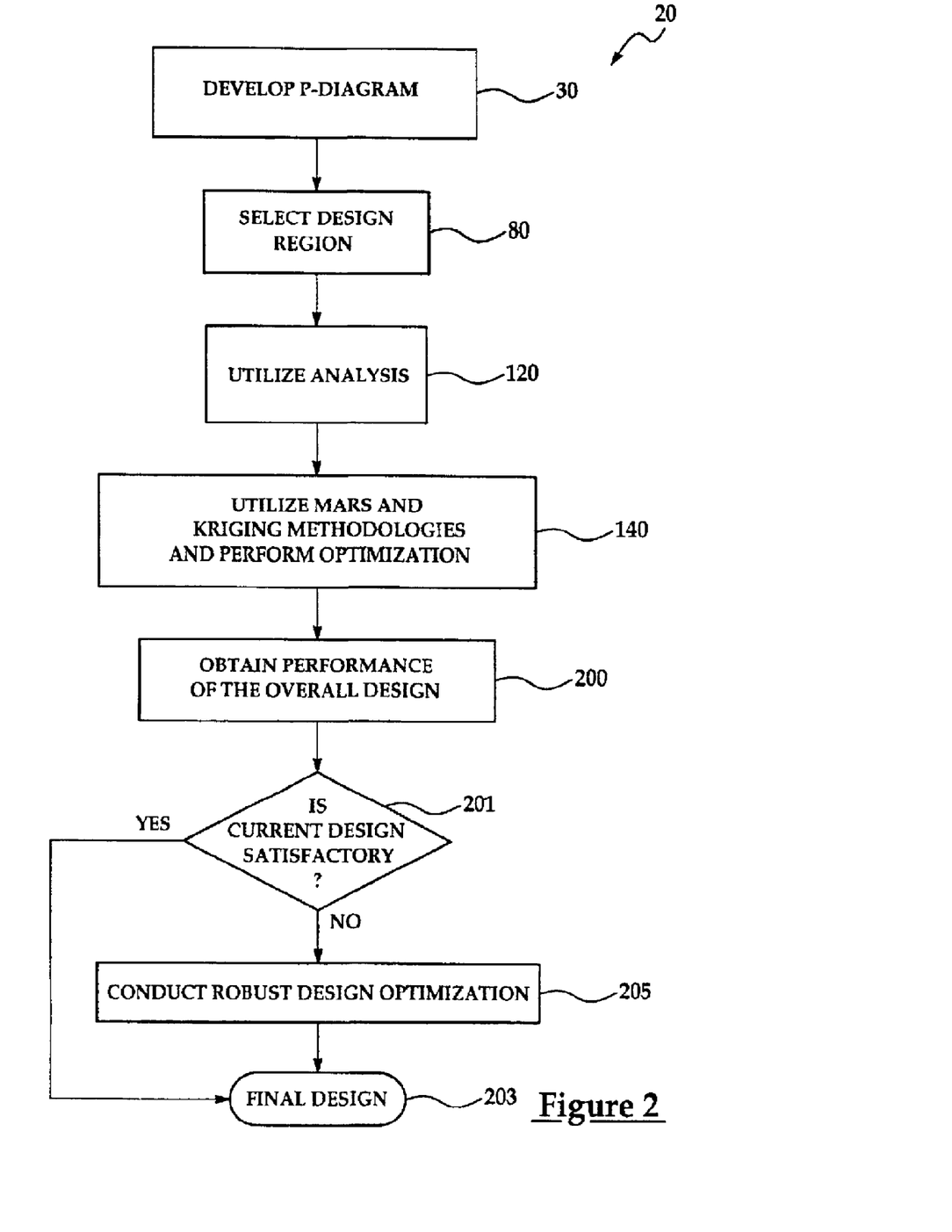
FIG. 2 is a flowchart illustrating the sequence of operational steps which comprise the methodology of the preferred embodiment of the invention.

Referring now to FIG. 2, there is shown a flowchart 20 which illustrates a sequence of operational steps which may be selectively performed by the system 10 (e.g., by the processor or the controller 14 which operates under stored program control). The initial step 30 of flowchart 20 requires the creation of an analytical reliability and robustness or parameter ("P") diagram 32 by the user of system 10.

Figure 3:
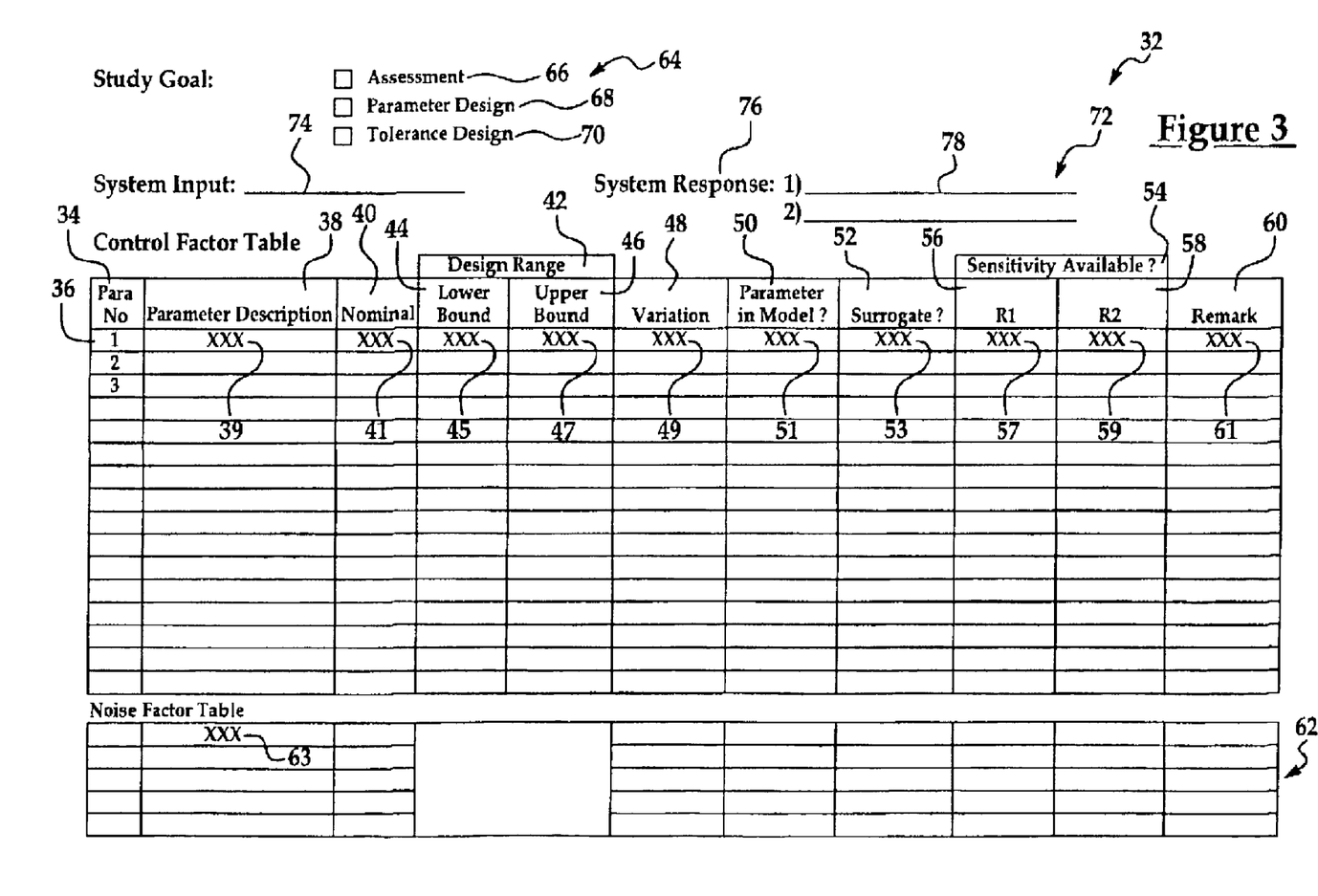
FIG. 3 is a diagram, which is created in step 30 of the flowchart which is shown in FIG. 2.

Particularly, diagram 32, as best shown in FIG. 3, includes a first column 34, which is denoted as "parameter number". Each row 36 within column 34 uniquely identifies a parameter within the computer added design model 18 which is to be analyzed. A "parameter" may be defined as some measurable attribute or characteristic of the received design 18 and may have one or more constituent variables. Diagram 32 includes a second column 38, which is denoted as "parameter description" and an entry 39 in the column 38 describes the parameter resident within the same row 36 as the entry 39. Diagram 32 further includes a third column 40 which is denoted as "nominal" and an entry 41 in a row 36 of column 40 denotes the nominal value of the parameter which is referenced in the same row 36. Diagram 32 further includes a pair of columns 42 which are denoted as "design range" and which include a fourth and a fifth column 44, 46. The fourth column 44 is denoted as "lower bound" and the fifth column 46 is denoted as "upper bound". An entry 45, within column 44, specifies the lowest feasible or acceptable/desired value for the parameter which is referred to in the same row 36 as the entry 45. An entry 47, within column 46, specifies the highest feasible or acceptable/desired value for the parameter which is referred to in the same row 36 as the entry 47.

The diagram 32 includes a sixth column 48 which is denoted as "variation". An entry 49, within the column 48, specifies the amount by which the nominal value, resident within the same row 36 as the entry 49, varies in the "real physical or operational environment" (e.g., within a vehicle). The diagram 32 further includes a seventh column 50 which is denoted as "parameter in model?". An entry 51, within column 50, denotes whether the parameter, which resides within the same row 36 as the entry 51, is included within the model 18. The diagram 32 includes an eighth column 52 and is denoted as "surrogate?". An entry 53 within the column 52 delineates whether the parameter, which is referred to in the same row 36 as the entry 53, is a surrogate. The term "surrogate," as should be appreciated by those of ordinary skill in the art, delineates a variable which may be the physical manifestation of another variable (e.g., the variable of temperature may manifest itself in a variable length of a desired product and therefore the variable of length may be a surrogate for the variable of temperature).

Diagram 32 includes a pair of columns 54 and this pair of columns are denoted as "sensitivity available?". The constituent columns 56, 58 of column pair 54 are respectively denoted as "R1" and "R2". An entry 57, within the column 56, denotes whether the sensitivity is available for the parameter resident within the same row 36 as the entry 57 for a first response of the model or design 18 to an input. An entry 59, within the column 58, denotes whether the sensitivity is available for the parameter resident within the same row 36 as the entry 59 for a second response of the model design 18 to an input.

Diagram 32 further includes an eleventh column 60, which is denoted as "remark". An entry 61 within the column 60 denotes or comprises any remarks that the user of system 10 desires to make with respect to the parameter resident within the same row 36 as the entry 61.

Diagram 32 includes a section 62 which is delineated as "noise factor table" and which includes entries 63 which are representative of and/or which comprise a noise or uncontrolled variable associated with the overall design and which impacts the performance of the overall design.

Diagram 32 further includes a section 64 which is denoted as "study goal" and which has three possible entries 66, 68, and 70 which are respectively denoted as "assessment", "parameter design", and "tolerance design". Entry 66 denotes the reliability/robustness assessment of the design made by the user of the system 10 upon the completion of the methodology of the preferred embodiment of the invention, entry 68 denotes the desired values for each of the parameters upon the completion of the methodology of the preferred embodiment of the invention, and entry 70 denotes the amount of variance which is acceptable or desired in each of parameter design values.

Step 30 requires that at least one of the entries 66, 68, and 70 be selected and defined by a user of system 10. Diagram 32 further includes a section 72 having a first entry 74 which is entitled "system input" and which requires a description of the input signal(s) which is (are) applied to the model or design 18 by the controller or processor 14, and a second entry 76 which is denoted as "system responses" and which has multiple entries 78 which require a description of the respective responses which are expected after one or more inputs have been applied to the model or design 18. Step 30 is completed upon the completion of the diagram 32 and this diagram 32 may be used to ensure that all of the necessary parameters are evaluated by the system 10 and to compare the analytical results of the system 10 against the desired attributes or characteristics of each of the parameters, thereby allowing the analyzed model or design to be used to construct an item or product having desired characteristics or attributes.

Step 30 is followed by step 80 in which the controller 14 is made to create and/or select a design region with which to sample the performance surface associated with and/or created by the design 18 as it is placed into a simulated operating environment by the controller or processor 14.

That is, as should be apparent to those of ordinary skill in the art, the relationship between all of the input variables or parameters and the output or performance may be thought of as or cooperatively forms a nonlinear response surface (e.g., each allowable and unique combination of input parameters produce output values which cooperatively form a performance surface). One non-limiting advantage of the invention is that a relatively small portion (e.g., the portion may be continuous or be formed from a plurality of discreet and discontinuous sample points) of the design space (e.g., the space formed from the interrelationship between or all of the allowable or possible combinations of input values of all of the parameters or variables) and a relatively small portion of the performance surface is used to reliably approximate the performance surface of the entire design, thereby reducing the overall cost associated with the creation and operation of the simulation and reducing the amount of time in which the simulation system must be operated. In the preferred embodiment, the samples are "spread out" through the entire design space and cooperatively form a true representation of the design space. Moreover, in the preferred embodiment, each sample point provides or is related to a certain performance sample point on the performance surface. Thus, the overall design space creates a performance space. The steps required by this portion or step 80 of the methodology 20 are delineated in the flowchart 90 of FIG. 4 and, as delineated above, seek to determine what portion of the overall design space is actually needed to reliably and desirably approximate the overall performance surface.

Figure 4:
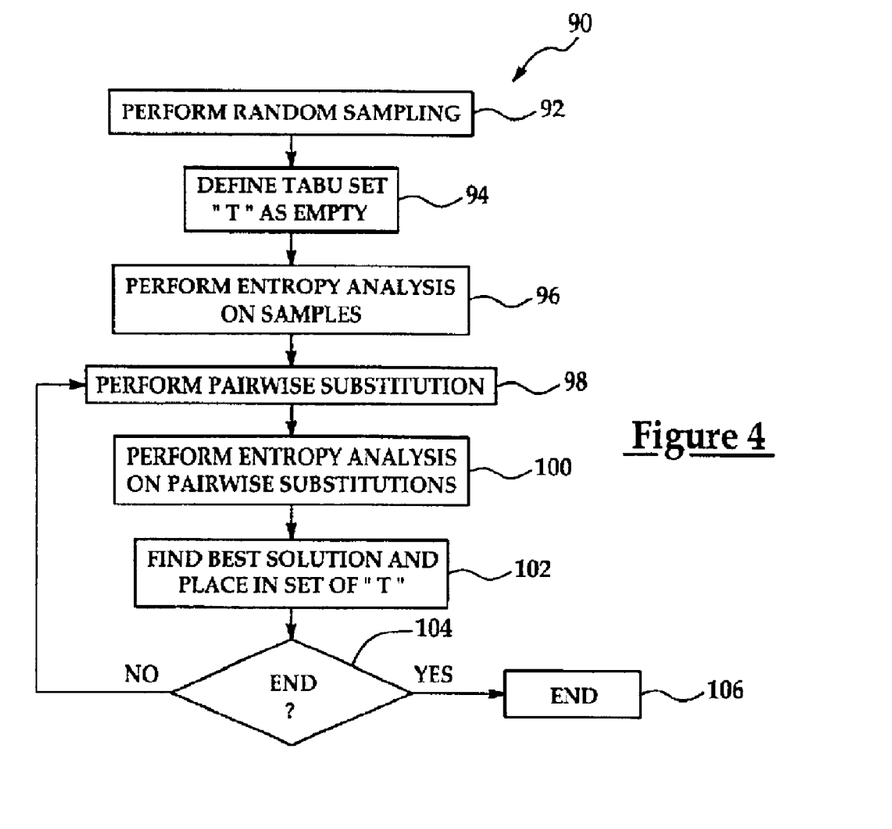
FIG. 4 is a flowchart which illustrates a sequence of operational steps used to generate a performance surface as required by the methodology of the preferred embodiment of the invention.

As shown in flowchart 90 of FIG. 4, the first step 92 of the portion or step 80 of the methodology 20 of the preferred embodiment of the invention requires that a relatively random sampling be made of the design space using a modified latin hypercube sampling technique. That is, a traditional latin hypercube sampling technique does not provide optimal spacing between sample points and therefore the obtained sample does not reliably represent or approximate the overall design or performance surface. In the preferred embodiment of the invention, as is further delineated below, the conventional Latin Hypercube sampling technique is heuristically combined with conventional "greedy" and "Tabu" methodologies to achieve a unique or modified Latin Hypercube algorithmic combination which allows for a substantially optimized approximation of the performance space.

Thus, in step 94, a Tabu set "T" is created and is initially made to be empty. An entropy analysis is applied to the previously obtained random samples, in step 96, and the "best" solution (e.g., the solution having the lowest entropy) is placed into a set denoted as "m+".

Step 98 follows step 96 and, in this step 98, a pair wise or "greedy" substitution is made of the previously obtained samples and, in step 100, an entropy analysis is performed an each pair wise substitution and each entropy is compared with the entropy of the sample currently within the set "m+". Step 102 follows step 100 and, in this step 102, only those samples having a certain entropy (e.g., having an entropy below some threshold which may be equal to the entropy of the sample placed in "m+") are placed in the set "T". Step 104 follows step 102 and, in this step 104, the controller or processor 14, determines whether the required number of iterations or time has elapsed or whether the entropy has not sufficiently improved during a certain time or sampling interval and, based upon this analysis, proceeds to step 106 and terminates methodology 90, or proceeds to step 98 in which another pair wise substitution is made and placed into the set "T" only if its entropy is lower than the entropy of the current sample which is resident within the set "T".

At the conclusion of flowchart 90, controller or processor 14 has a set of design points (e.g., a certain portion of the design space) which cooperatively create and/or cooperatively form a certain portion of the performance space or surface (e.g., the resultant performance surface is cooperatively formed by the solutions or output values of each of these samples) and this performance surface may be used to extrapolate or approximate the remainder of the performance surface.

Step 120 follows step 80 and, in this step 120, a computer based simulation is conducted by the processor or controller 14 in order to determine the response which is obtained from such an analysis.

Figure 5:
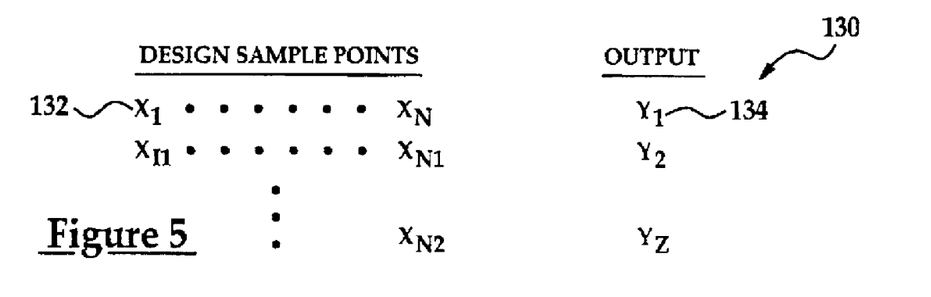
FIG. 5 is a chart illustrating the response of a design which is analyzed by system 10 by the use of certain sampled design points in accordance with step 120 of the methodology of the preferred embodiment of the invention.

That is, as shown by chart 130 of FIG. 5, a set of design sample points or values 132 (e.g., each set includes each of the parameters 39 specified in a single row 36 of the chart 32) is communicated to the processor or controller 14 and applied to and/or incorporated within the design 18, thereby causing the design 18 to respond by outputting at least one value 134 for each set of design or input points/values 132. That is, the design 18 may have many sets of design points 132 which are sequentially communicated to it and each set of design points or parameters 132 causes a respective output response 134 to be created. These sets of design parameters or points 132 and the respective responses 134 are noted in step 120 of methodology or flowchart 20.

Step 140 follows step 120 and, in this step 140, the controller or processor 14 utilizes the publicly available MARS algorithms or methodology which is disclosed in the paper entitled Multivariate Adaptive Regression Splines, which is authored by Jerome H. Friedman, which is published in the Annals of Statistics (1991), vol. 19, No. 1, 1–141, and which is fully and completely incorporated herein by reference.

Particularly, the MARS methodology is applied on each row or set of design points or parameters 132 and causes the creation of a respective output value for each such row or set of design points or parameters 132. The difference between the output value which is obtained from the design 18 for a row or set 132 and the output value obtained from the MARS methodology for the same row or set of parameters 132 is defined as the "residual". In this manner, a residual value is created for each row or of design points or values 132.

Further, in step 140, the controller or processor 14 uses the residual value from each row 36 or set of design points 132 and uses the publicly available Kriging methodology or algorithms to create an additional output value for each row 132 (e.g., the residual value for a row 132 or set of design points 132 is used, by the Kriging methodology, to generate an output value for that row or set of design points 132). The Kriging methodology or algorithms are set forth, for example and without limitation, in the paper entitled Screening, Predicting, and Computer Experiments, which is written by William J. Welch et al., which is published in Technometric; vol. 34, No. 1 (February 1992) and which is fully and completely incorporated herein by reference. The respective MARS and Kriging output values, for each row or set of design points 132, are then added. An output value 134 should be substantially equal to the addition of the MARS and Kriging value for the row 132 which generated the value 134, thereby validating the use of the combined MARS and Kriging simulation methodologies to simulate the performance surface. At the conclusion of this portion of step 140, the respective MARS and Kriging output values for each row or set of design points or parameters 132, which have been added, are respectively stored within the computer or processor 14 as an output value.

A certain optimization methodology is then performed in step 140 in order to ensure that the set of design parameters or points, obtained in step 80, provides an approximation of the performance surface to a desired level of accuracy. This methodology is shown within flowchart 150 of FIG. 6.

Figure 6:
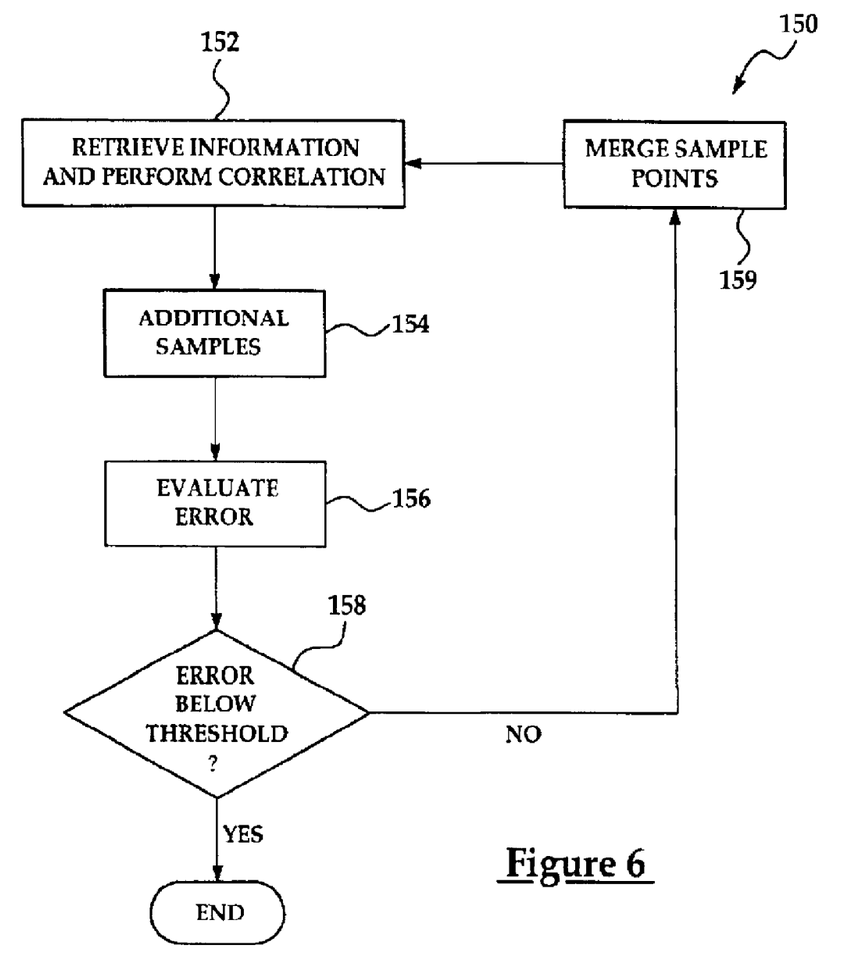
FIG. 6 is a flowchart illustrating a sequence of operational steps used by the methodology of the preferred embodiment of the invention to substantially optimize the developed approximation model.

Particularly, flowchart or methodology 150 begins with an initial step 152 in which the controller or processor 14 retrieves the information resident within the chart 130 of FIG. 5. This information is then used by the controller or processor 14 in combination with the Kriging methodology software to evaluate the correlation or the amount of non-linearity for each of the utilized parameters. In this manner, the most "critical" parameters are identified (e.g., those parameters whose behavior or output values have a respective non-linear relationship to the input values and which are relatively difficult to approximate, especially with a relatively small sample). In step 154, a certain number of additional samples are made of those parameters having a relatively high level of non-linearity and these samples are added to those included within the chart 130 (e.g., the additional samples 132 and their respective output values 134 are noted on the chart 130 and stored within the computer or processor 14). In step 156, the modeling error is evaluated on the new matrix of design points (e.g. the respective output values associated with these new samples which are predicted by the combined MARS and Kriging methodologies and the actual respective output value generated by and/or from the design 18 for these new sample points are compared). The difference between these respective values for each set of new sample points is defined as the modeling error. In step 158 the modeling error is compared with a threshold value. If, in step 158, each such error is below the threshold value, the process is concluded. Otherwise, the two sets of design points or parameters (e.g., the previously obtained and new sample points) are combined in step 159 and steps 152, 154, 156, and 158 are again completed. At the conclusion of step 150, sufficient design parameter samples are obtained in order to produce an approximation of the performance surface having a sufficient degree of accuracy.

Step 200 follows step 140 and, in this step 200, the design parameters which approximate the performance surface are input to the processor or controller 14 in order to obtain certain information about the overall design by the use of a successive linear approximation method or by use of any other conventional approximation or simulation methodology. Step 201 follows step 200 and, in this step 201, the user or the controller or processor determines whether the design is satisfactory. If the design is satisfactory, step 201 is followed by step 203 in which the controller or processor 14 adopts the design as the "final design". Alternatively, step 201 is followed by step 205 in which the controller and/or processor 14 conducts an optimization process or methodology.

In step 205, for example and without limitation, the controller 14 creates a probability distribution function, for each output value (which is associated with and/or is found from at least one variable), such as 134, and then calculates the distance between a fist certain percentile value, for example and without limitation a ten percentile value, and a second certain percentile value, for example and without limitation, the ninety percentile value, thereby assessing the amount of variance or robustness in each of the output values. A large amount of distance between these respective percentile points evidences a large amount of undesirable and respective variance, and the system 10 searches for values of these variables which reduces this distance and allows for the creation of a more robust product.

Figure 8:
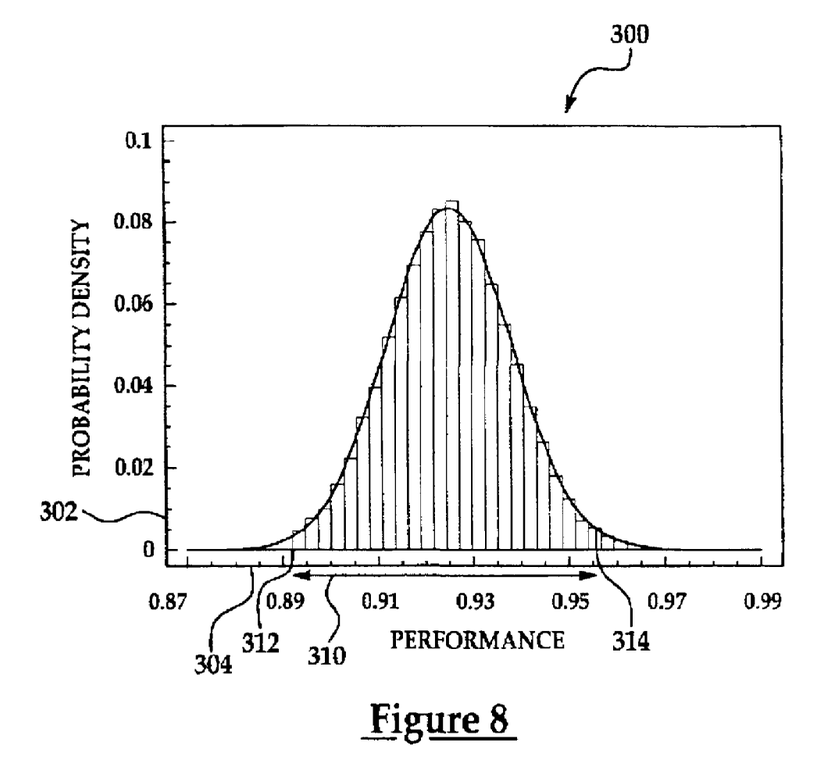

That is, as shown best in graph 300 of FIG. 8, controller or processor 14 further evaluates the relationship between the value of the performance (e.g. appearing on axis 304) and the probability of occurrence (appearing on axis 302) in order to determine the robustness of a certain design setting. Particularly, a relatively robust design setting produces a relatively short distance 310 between a first percentile point, such as and without limitation, the tenth percentile point 312 and a second percentile point, such as and without limitation, the ninetieth percentile point 314.

The controller or processor 14, in this step 200, utilizes the saddle point method with second order approximation in order to compute a probability, which may be used by way of example without limitation to obtain the most probable point. Particularly, in the most preferred embodiment of the invention the most probable point is representative of the setting of compound noise within the system. It should be noted that the use of the most probable point of the performance surface allows a simulation to be "probabilistically" operated or analyzed (e.g., at the most probable point) in order to allow the simulation to provide "real world" or "real operational" results.

Figure 7:
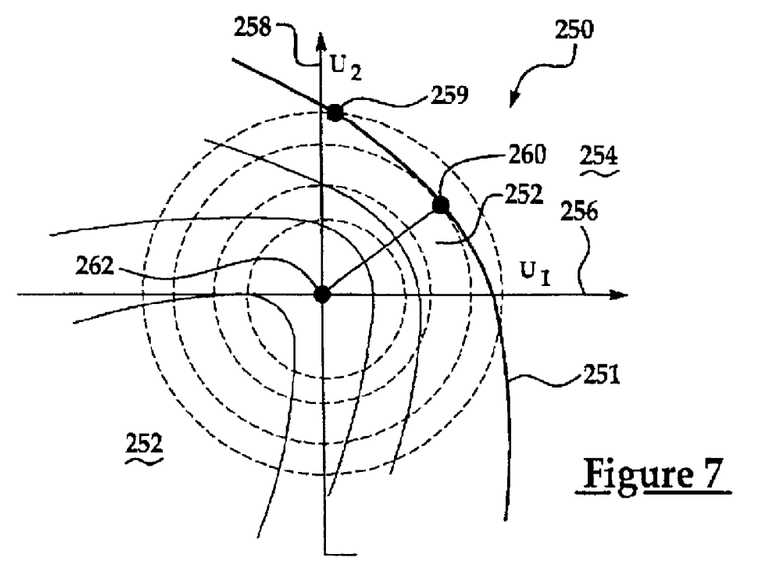
FIG. 7 is a diagram illustrating the methodology used by and/or incorporated within the system of the preferred embodiment of the invention to determine a "most probable point" and FIG. 8 is a diagram illustrating the methodology used by and/or incorporated the system of the preferred embodiment of the invention to determine the robustness of a variable or parameter.

Referring now to FIG. 7, there is shown a graph 250 which illustrates the technique or methodology used by controller or processor 14 to locate or fix the most probable point which is defined, within the system 10, as the point 260 which lies on the border 251 of the acceptable and non-acceptable performance spaces which are respectively denoted as spaces 252 and 254. That is, the controller or processor 14 evaluates the performance space by use of the design parameters 256, 258 (e.g., each performance point 259 is a function of each parameter 256, 258) and determines which of the points 259 is most probable. In other non-limiting embodiments of the invention, the performance space may be comprised of many variables and parameters. As further shown, within FIG. 7, in the preferred embodiment of the invention, the performance spaces 252 and 254 are normalized, thereby having the nominal value at the origin and the most probable point thereby occurs on the boundary 251 and has the smallest distance to the origin 262 of any other point on the boundary 251. The sensitivity around the point 260 determines, in part, the amount of influence of the variables, which are plotted on one or both of the axes 256, 258.

That is, in the most preferred embodiment of the invention, the "influence" of a variable is defined by the total or sum of the sensitivity and the amount of variability ("noise") of the variable and, in the system of the preferred embodiment of the invention, the controller 14 analyzes the influence of each parameter and each constituent variable in order to display to the user those parameters and/or constituent variables, for each design point, which are most influential in the overall design, thereby allowing the user to select design points having other parameters which may be easier to control and which have less influence. Lastly, in the preferred embodiment of the invention, the contribution of compound noise is dynamically calculated for each design point, which is utilized, in order to obtain a more accurate overall result. That is, the calculated compound noise may then be utilized by the simulation methodology, in a conventional manner, to achieve a more accurate overall result.

It is to be understood that the invention is not limited to the exact construction or method which has been delineated above, but that various changes and modifications may be made without departing from the spirit and the scope of the inventions as are more fully delineated in the following claims. It should be further appreciated the combined MARS and Kriging methodologies allow for the creation of accurate simulation by use of only a relatively small portion of the design space and the performance surface.

What is claimed is:

1. A method of interactively analyzing and optimizing a computer generated model of a design of a vehicle, said method comprising the steps of:

preparing an analytical reliability and robustness parameter diagram using a computer system, wherein said reliability and robustness parameter diagram identifies a parameter within the computer generated model of the vehicle design to be analyzed and a set of design points of corresponding characteristics;

selecting a portion of a design space from the computer generated model of the vehicle design to approximate an associated performance surface and randomly selecting sample points within the selected portion of the design space;

performing a computer-based engineering simulation using the randomly selected sample points as an input value, to determine a corresponding output value;

determining a residual output value using the randomly selected sample points, wherein the residual output value is determined by approximating a performance surface response for the randomly selected sample points;

optimizing the approximated performance surface response within a predetermined degree of accuracy;

determining a performance of the design using the optimized response that approximates the performance surface;

evaluating the performance of the design by the user to determine if the design meets a predetermined criteria;

adopting the design as a final design if the performance meets the predetermined criteria, otherwise continuing to optimize the overall design to be robust using a relationship between a value of the performance and a probability of occurrence, until the design meets the predetermined criteria; and using the design for the vehicle.

2. The method as set forth in claim 1, wherein said step of identifying a parameter diagram further includes the steps of:

describing the identified parameter;

specifying a range for the identified parameter;

specifying a variation for the identified parameter;

specifying an uncontrolled variable for the identified parameter;

specifying a design goal for the identified parameter;

specifying an assessment of a reliability of the identified parameter;

specifying an acceptable variance for the identified parameter;

describing a system input signal applied to the design model; and specifying an expected system response to the system input signal.

3. The method as set forth in claim 1 wherein said step of selecting a design space further includes the steps of:

randomly sampling the design space using an optimal Latin hypercube sampling technique, which further including the steps of:

defining a Tabu set and initially setting the Tabu set to empty;

performing an entropy analysis on a random sample of design points and placing a design point with a best solution into an m+ set, wherein the best solution is the solution having the lowest entropy;

performing a pairwise substitution using the random sample of design points;

performing an entropy analysis on each pairwise substitution, and comparing each pairwise substitution entropy with the entropy value for the best solution stored within the set m+;

placing each randomly sampled design point having an entropy below a predetermined threshold in the "T" set; and determining whether the design points in the "T" set represent a best solution, and returning to the step of performing the pairwise substitution if they do not represent the best solution, and using the design points within the "T" set to approximate a performance surface if they do represent the best solution.

4. The method as set forth in claim 1 wherein said step of performing a simulation by the computer system further includes the steps of:

performing a computer-aided engineering analysis on the model to determine an actual output response.

5. The method as set forth in claim 1 wherein said step of determining a residual output value further includes the steps of:

applying a Multivariate Adaptive Regressive Spline (MARS) technique to the randomly selected design points to determine a MARS output value, and the residual value is a difference between the output value obtained from the computer-based engineering simulation and the MARS output value;

using the residual value and a Kriging algorithm to determine a Kriging output value for the randomly selected design points;

summing together the residual value and Kriging output value for the randomly selected design points to approximate a performance surface; and comparing the simulated performance surface to the calculated performance surface to validate the approximated performance surface, and storing the validated MARS residual value and Kriging output value in the processor.

6. The method as set forth in claim 1 wherein said step of optimizing the set of design points further includes the steps of:

selecting the parameter representing the randomly selected sample points and a corresponding output value;

evaluating a correlation of the parameter to the approximated performance surface, wherein the correlation is an amount of non-linearity of the parameter;

identifying a parameter having a high level of non-linearity and adding the additional design points for the identified parameter to the randomly selected sample points and the corresponding output value;

determining a modeling error by comparing a difference between the approximated output value and the actual output value; and comparing the modeling error with a predetermined threshold modeling error, and using the approximated performance surface if the modeling error is below the predetermined threshold, otherwise combining the additional sample points with the randomly selected sample points and returning to the step of selecting the parameter if the modeling error is above the predetermined threshold.

7. The method as set forth in claim 1 wherein said step of determining the performance of the design further includes the steps of:
   selecting a design parameter that approximates the performance surface; and
   using a successive linear approximation method to approximate the performance surface.

8. The method as set forth in claim 1 wherein said step of continuing to optimize the overall design to be robust further includes the steps of creating a probability distribution function for each output value.

9. The method as set forth in claim 8 further including the steps of: calculating a distance between a first percent value and a second percent value to determine a robustness of each approximated output value, wherein there is a direct correlation between variance and robustness; and
   identifying the output value and corresponding parameter with the smaller distance as robust.

10. The method as set forth in claim 8 further including the step of using a saddle point method with second order approximation to determine a most probable point within the probability distribution function.

11. The method as set forth in claim 8 further includes the steps of:
   normalizing the performance space, so that the nominal value is at the origin and the most probable point is located on a boundary and has a smaller distance to the origin then other points on the boundary; and
   determining an influence of the parameter from a sensitivity around the most probable point, wherein the influence is a summation of a sensitivity and a variability of the parameter.

12. The method as set forth in claim 1 further including the step of providing the user with the most influential variables for each design point.

13. A method of interactively analyzing and optimizing a computer generated model of a design of a vehicle, said method comprising the steps of:
   preparing an analytical reliability and robustness parameter diagram using a computer system, wherein said reliability and robustness parameter diagram identifies a parameter within the computer generated model of the vehicle design to be analyzed and a set of design points of corresponding characteristics;
   selecting a portion of a design space from the computer generated model of the vehicle design to approximate an associated performance surface and randomly selecting sample points within the selected portion of the design space;
   performing a computer-aided engineering analysis on the model using the randomly selected sample points as an input value, to determine a corresponding output value to determine an actual output response;
   determining a residual output value using the randomly selected sample points, wherein the residual output value is determined by approximating a performance surface response for the randomly selected sample points;
   optimizing the approximated performance surface response within a predetermined degree of accuracy;
   determining a performance of the design using the optimized response that approximates the performance surface by selecting a design parameter that approximates the performance surface and using a successive linear approximation method to approximate the performance surface;
   evaluating the performance of the design by the user to determine if the design meets a predetermined criteria;
   adopting the design as a final design if the performance meets the predetermined criteria, otherwise continuing to optimize the overall design to be robust using a relationship between a value of the performance and a probability of occurrence by creating a probability distribution function for each output value, until the design meets the predetermined criteria;
   providing the user with the most influential variables for each design point; and
   using the final design in the vehicle.

14. The method as set forth in claim 13, wherein said step of identifying a parameter diagram further includes the steps of:
   describing the identified parameter;
   specifying a range for the identified parameter;
   specifying a variation for the identified parameter;
   specifying an uncontrolled variable for the identified parameter;
   specifying a design goal for the identified parameter;
   specifying an assessment of a reliability of the identified parameter;
   specifying an acceptable variance for the identified parameter;
   describing a system input signal applied to the design model; and
   specifying an expected system response to the system input signal.

15. The method as set forth in claim 13 wherein said step of selecting a design space further includes the steps of:
   randomly sampling the design space using an optimal Latin hypercube sampling technique, which further including the steps of:
   defining a Tabu set and initially setting the Tabu set to empty;
   performing an entropy analysis on a random sample of design points and placing a design point with a best solution into an m+ set, wherein the best solution is the solution having the lowest entropy;
   performing a pairwise substitution using the random sample of design points;
   performing an entropy analysis on each pairwise substitution, and comparing each pairwise substitution entropy with the entropy value for the best solution stored within the set m+;
   placing each randomly sampled design point having an entropy below a predetermined threshold in the "T" set; and
   determining whether the design points in the "T" set represent a best solution, and returning to the step of performing the pairwise substitution if they do not represent the best solution, and using the design points within the "T" set to approximate a performance surface if they do represent the best solution.

16. The method as set forth in claim 15 wherein said step of determining a residual output value further includes the steps of:
   applying a Multivariate Adaptive Regressive Spline (MARS) technique to the randomly selected design points to determine a MARS output value, and the residual value is a difference between the output value obtained from the computer-based engineering simulation and the MARS output value;

using the residual value and a Kriging algorithm to determine a Kriging output value for the randomly selected design points;

summing together the residual value and Kriging output value for the randomly selected design points to approximate a performance surface; and comparing the simulated performance surface to the calculated performance surface to validate the approximated performance surface, and storing the validated MARS residual value and Kriging output value in the processor.

17. The method as set forth in claim 16 wherein said step of optimizing the set of design points further includes the steps of:

selecting the parameter representing the randomly selected sample points and a corresponding output value;

evaluating a correlation of the parameter to the approximated performance surface, wherein the correlation is an amount of non-linearity of the parameter;

identifying a parameter having a high level of non-linearity and adding the additional design points for the identified parameter to the randomly selected sample points and the corresponding output value;

determining a modeling error by comparing a difference between the approximated output value and the actual output value; and comparing the modeling error with a predetermined threshold modeling error, and using the approximated performance surface if the modeling error is below the predetermined threshold, otherwise combining the additional sample points with the randomly selected sample points and returning to the step of selecting the parameter if the modeling error is above the predetermined threshold.

18. The method as set forth in claim 13 wherein said step of creating a probability distribution function for each output value further includes the steps of:

calculating a distance between a first percent value and a second percent value to determine a robustness of each approximated output value, wherein there is a direct correlation between variance and robustness; and identifying the output value and corresponding parameter with the smaller distance as robust.

19. The method as set forth in claim 18 further including the step of using a saddle point method with second order approximation to determine a most probable point within the probability distribution function.

20. The method as set forth in claim 18 further includes the steps of:

normalizing the performance space, so that the nominal value is at the origin and the most probable point is located on a boundary and has a smaller distance to the origin then other points on the boundary; and determining an influence of the parameter from a sensitivity around the most probable point, wherein the influence is a summation of a sensitivity and a variability of the parameter.

21. A system of interactively analyzing and optimizing a computer generated model of a design of a vehicle comprising:

a computer system, wherein said computer system includes a processor having a memory, an input means operatively in communication with said processor and a display means operatively in communication with said processor;

a computer aided design model of a vehicle that is stored in a database and operatively communicated to said processor;

a computer aided engineering analysis software program that is operatively in communication with said processor;

an analytical reliability and robustness parameter diagram stored in the memory of said computer system, wherein said reliability and robustness parameter diagram identifies a parameter within the computer aided design model of the vehicle and a set of design points of corresponding characteristics; and a vehicle model analysis and optimization software programs stored in the memory of said computer system, where said analysis and optimization software program selects a portion of a design space from the computer generated model of the vehicle design to approximate an associated performance surface and randomly selects sample points within the selected portion of the design space, performs a computer-based engineering simulation using the randomly selected sample points as an input value, to determine a corresponding output value, determines a residual output value using the randomly selected sample points, wherein the residual output value is determined by approximating a performance surface response for the randomly selected sample points, optimizes the approximated performance surface response within a predetermined degree of accuracy, determines a performance of the design using the optimized response that approximates the performance surface, evaluates the performance of the design by the user to determine if the design meets a predetermined criteria, adopts the design as a final design if the performance meets the predetermined criteria, otherwise continues to optimize the overall design to be robust using a relationship between a value of the performance and a probability of occurrence, until the design meets the predetermined criteria and uses the design in the design of the vehicle.

* * * * *